United States Patent
Sabloniere

(10) Patent No.: US 9,880,788 B2
(45) Date of Patent: Jan. 30, 2018

(54) MODELING THE EFFECTS OF SWITCHING DATA STORAGE RESOURCES THROUGH DATA STORAGE POOL TIER PERFORMANCE CAPACITY AND DEMAND GAP ANALYSIS

(71) Applicant: International Business Machines Corporation, Armonk, NY (US)

(72) Inventor: Pierre Sabloniere, Paris (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/934,264

(22) Filed: Nov. 6, 2015

(65) Prior Publication Data
US 2016/0179405 A1 Jun. 23, 2016

(30) Foreign Application Priority Data

Dec. 19, 2014 (GB) .................................. 1422755.7

(51) Int. Cl.
G06F 13/00 (2006.01)
G06F 3/06 (2006.01)

(52) U.S. Cl.
CPC ............ *G06F 3/0689* (2013.01); *G06F 3/061* (2013.01); *G06F 3/0647* (2013.01); *G06F 3/0653* (2013.01)

(58) Field of Classification Search
CPC ...... G06F 3/0689; G06F 3/061; G06F 3/0647; G06F 3/0653
USPC ..................................................... 711/112, 4
See application file for complete search history.

(56) References Cited

U.S. PATENT DOCUMENTS

| 8,473,678 B1 | 6/2013 | Rajasekaran et al. |
| 8,549,224 B1 | 10/2013 | Zeryck et al. |
| 8,645,662 B2 | 2/2014 | Burton et al. |
| 8,706,963 B2 | 4/2014 | Yamagiwa et al. |

(Continued)

FOREIGN PATENT DOCUMENTS

WO 2010099992 A1 9/2010

OTHER PUBLICATIONS

Unknown, "Fast VP tiering overview," https://library.netapp.com/ecmdocs/ECMP1154894/html/GUID-DA3D4150-1262-4B99-90D9-F16B8A74CD1C.html, 1 pg., ©1994-2013, NetApp., Inc., (last printed Sep. 21, 2015 3:05 PM).

(Continued)

*Primary Examiner* — Hong Kim
(74) *Attorney, Agent, or Firm* — Nicholas D. Bowman

(57) ABSTRACT

The assignment of data storage resources in a data storage arrangement having a plurality of pools, where each pool includes a plurality of data storage resources arranged in tiers, can be optimized. A gap analysis can be performed for each tier of each pool to determine that tier's excess capacity or demand. The effect of switching data storage resources between tiers of different pools can be modeled to determine the effect of the switch on excess capacity and demand. An improved arrangement of data storage resources in the tiers can be determined that reduces excess capacity and demand, from the modeling of the effect of switching data storage resources between pools. At least one data storage resource can be switched from the tier of the first pool to the tier of the second pool to match the determined improved arrangement of data storage resources.

12 Claims, 4 Drawing Sheets

(56) References Cited

U.S. PATENT DOCUMENTS

| | | |
|---|---|---|
| 9,612,746 B1 | 4/2017 | Wang et al. |
| 9,632,707 B2 | 4/2017 | Hyde, II et al. |
| 9,639,400 B2 | 5/2017 | Gokhale et al. |
| 2010/0312979 A1 | 12/2010 | Kavuri et al. |
| 2012/0005435 A1 | 1/2012 | Emaru et al. |
| 2012/0185644 A1* | 7/2012 | Kaneko ............... G06F 3/061 |
| | | 711/114 |
| 2012/0317358 A1 | 12/2012 | Ando et al. |
| 2014/0149663 A1 | 5/2014 | Golander et al. |
| 2017/0103356 A1* | 4/2017 | Sabloniere ........ G06F 17/30312 |

OTHER PUBLICATIONS

International search report dated Jun. 12, 2015, Application No. GB1422755.7, 3 pgs.

Sabloniere, P, "Data Storage Resource Assignment," Application No. GB1422755.7, filed Dec. 19, 2014, 20 pages.

* cited by examiner

MODELING THE EFFECTS OF SWITCHING DATA STORAGE RESOURCES THROUGH DATA STORAGE POOL TIER PERFORMANCE CAPACITY AND DEMAND GAP ANALYSIS

BACKGROUND

The present disclosure generally relates to a method of, and system for, optimizing the assignment of data storage resources in a multi-pool data storage arrangement.

Optimization of a multi-pool storage infrastructure may be required and this is realized in advanced infrastructures by LUN (logical unit number) migration between pools. When migrated to a new pool, any LUN history acquired by an auto-tiering tool in the original pool is lost and needs to be re-created from scratch in the new pool causing potential damage to LUN performance. As storage media technology is increasingly causing workload to be distributed between pools optimized by auto-tiering, multi-pool optimization using LUN migration between pools will cause systematic pain to migrated LUN until the auto-tiering recreates the LUN history and completes suitable optimization placements.

SUMMARY

According to aspects of the present disclosure, there is provided a method of optimizing the assignment of data storage resources in a multi-pool data storage arrangement, where each pool includes a plurality of data storage resources arranged in tiers. The method includes the operation of performing a gap analysis for each tier of each pool, where the gap analysis determines the extent to which each tier of each pool has excess capacity or excess demand. The method also includes modeling the effect of switching data storage resources from a tier of a first pool to a tier of a second pool to determine the effect of the switch on excess capacity and excess demand. The method also includes determining an improved arrangement of data storage resources in the tiers of the pools that reduces excess capacity and excess demand, from the modeling of the effect of switching data storage resources between pools. The method also includes switching at least one data storage resource from a tier of a first pool to a tier of a second pool to match the improved arrangement of data storage resources.

According to aspects of the present disclosure, there is provided a system for optimizing the assignment of data storage resources in a multi-pool data storage arrangement, where each pool includes a plurality of data storage resources arranged in tiers. The system includes a processor arranged to perform a gap analysis for each tier of each pool. The gap analysis determines the extent to which each tier of each pool has excess capacity or excess demand and models the effect of switching data storage resources from a tier of a first pool to a tier of a second pool in terms of the effect of the switch on excess capacity and excess demand. The processor also determines an improved arrangement of data storage resources in the tiers of the pools that reduces excess capacity and excess demand, as a result of the modeling of the effect of switching data storage resources between pools. The processor also switches at least one data storage resource from a tier of a first pool to a tier of a second pool to match the improved arrangement of data storage resources.

According to aspects of the present disclosure, there is provided a computer program product on a computer readable medium for optimizing the assignment of data storage resources in a multi-pool data storage arrangement, where each pool includes a plurality of data storage resources arranged in tiers. The computer program product includes instructions for performing a gap analysis for each tier of each pool, where the gap analysis determines the extent to which each tier of each pool has excess capacity or excess demand. The computer program product also includes instructions for modeling the effect of switching data storage resources from a tier of a first pool to a tier of a second pool in terms of the effect of the switch on excess capacity and excess demand. The computer program product also includes instructions for determining an improved arrangement of data storage resources in the tiers of the pools that reduces excess capacity and excess demand, from the modeling of the effect of switching data storage resources between pools. The computer program product also includes instructions for switching at least one data storage resource from a tier of a first pool to a tier of a second pool to match the improved arrangement of data storage resources.

According to embodiments, it is possible to provide a new approach to optimization of the resources used in a multi-pool arrangement with proposed shifting of resources such as Managed Disks (MDisks) between pools to optimize multi-pool behavior. This approach does not cause LUN history to be forgotten by the auto-tiering analytics and the auto rebalance feature of auto-tiering will quickly re-optimized resource usage by workloads in each of the pools without creating any substantial temporary disorder to workloads. The ideal purpose of determining the best arrangement of data storage resources in the tiers of the pools for reducing excess capacity and excess demand includes matching excess capacity to excess demand in the same tiers in different pools is to reduce overall excess capacity and excess demand to a minimum.

In embodiments, the improved solution can use an auto-tiering analytics algorithm which would be applied to each pool with different scenarios exploring different resource shift cases. The auto-tiering tool would produce an optimization cost value for each of these different scenarios to identify which scenario is optimum and which optimization cost reduction (if any) these new scenarios would represent. Auto-tiering reporting would therefore produce the list of explored scenarios sorted by decreasing optimization cost value. A simple threshold-based trigger could instruct a virtualization layer to remove resources (such as MDisks if this technology is used) to be shifted from a source pool, wait until the removal is complete and insert the resource into a target pool. The decision making could be based on a more sophisticated approach such as verifying for more than one observation period the resource shifting recommendation is suitable. The auto-tiering would use existing algorithms and automation mechanisms in place to optimize again the source and target pools without at any time losing the LUN history.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Embodiments of the present disclosure will now be described, by way of example only, with reference to the following drawings.

Figure 1:
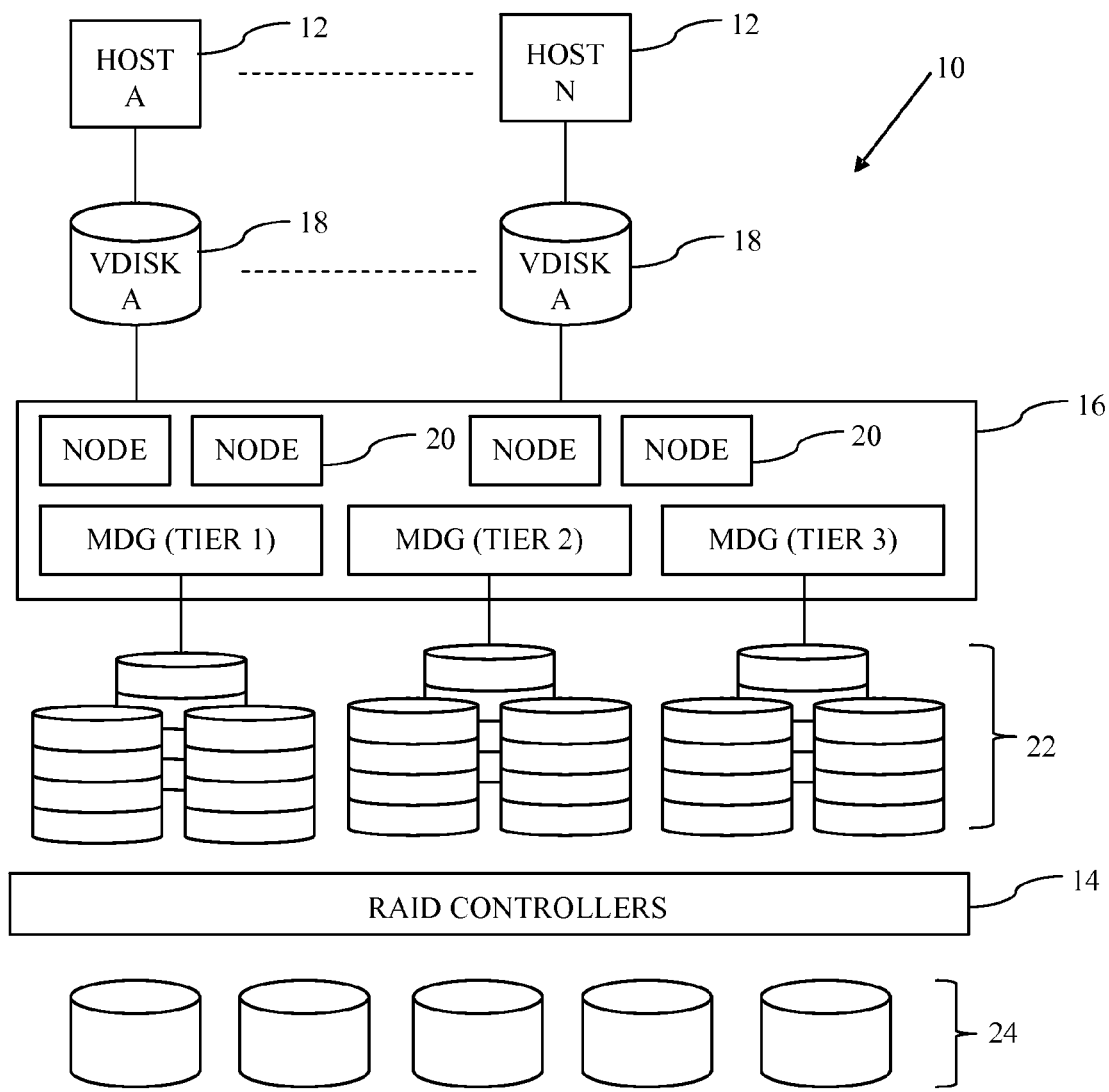
FIG. 1 is a block diagram of a data storage arrangement.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

A data storage infrastructure is often composed of multiple pools where storage data placement is locally optimized within each pool by using auto-tiering algorithms such as IBM® Easy Tier®. Easy Tier® is operated to automate data placement throughout a storage system disk pool. Easy Tier® enables a system, automatically and without disruption to applications, to relocate data across different drive tiers within a pool. For example, International Patent Application Publication WO 2010/099992 describes a method and system for managing the placement of storage data in a multi-tier virtualized storage infrastructure.

FIG. 1 shows a storage area network (SAN) 10 with several host application servers 12 connected thereto. These application servers 12 can be of different types, for example some could be enterprise servers, and some could be user workstations. Also connected to the SAN 10, via Redundant Array of Inexpensive Disks (RAID) controllers 14, are various levels of physical storage. In the present example, there are three levels of physical storage: Tier 1, which may be, for example enterprise level storage, such as the IBM© System Storage DS8000; Tier 2, which may be mid-range storage, such as the IBM© System Storage DS5000 equipped with FC disks; and Tier 3 which may be lower end storage, such as the IBM© System Storage DS4700 equipped with Serial Advanced Technology Attachment (SATA) drives.

The SAN is virtualized by means of a storage virtualization engine 16 which sits in the data path for all SAN data, and presents Virtual Disks 18 to the host servers and workstations 12. These virtual disks 18 are made up from the capacity provided across the three tiers of the storage devices. The virtualization engine 16 includes one of more nodes 20 (four shown), which provide virtualization, cache and copy services to the hosts. Typically, the nodes 20 are deployed in pairs and make up a cluster of nodes 20, with each pair of nodes 20 known as an Input/Output (I/O) group.

As storage is attached to the SAN 10 it is added to various pools of storage each controlled by a RAID controller 14. Each RAID controller 14 presents an SCSI (Small Computer System Interface) disk to the virtualization engine 16. The presented disk may be managed by the virtualization engine 16, and be called a managed disk, or MDisk. These MDisks are split into extents, fixed size blocks of usable capacity, which are numbered sequentially from the start to the end of each MDisk. These extents can be concatenated, striped, or any desirable algorithm can be used to produce larger virtual disk (VDisks) which are presented to the hosts 12 by the nodes 20.

The MDisks M1-M9 can be grouped together in Managed Disk Groups, or MDGs 22, typically characterized by factors such as performance, RAID level, reliability, vendor, and so on. According to embodiments, all MDisks in an MDG represent storage of the same tier level, as shown in FIG. 1. There may be multiple MDGs of the same tier in the virtualized storage infrastructure, each being a discrete virtual storage pool. Typically, each MDisk corresponds to a single tier and each RAID array 24 belongs to a single tier. Each of the RAID controllers 14 may control RAID storage belonging to different tiers. In addition to different tiers being applied to different physical disk types, different tiers may also be applied to different RAID types; for example, a RAID-5 array may be placed in a higher tier than a RAID-0 array.

Figure 2:
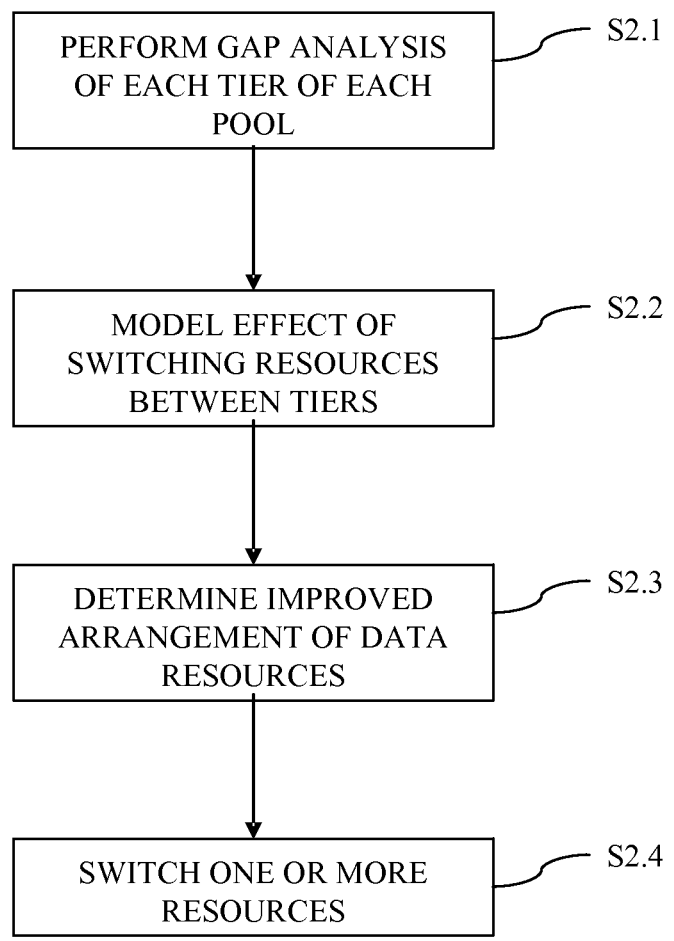
FIG. 2 is a flow diagram of a method of optimizing the assignment of data storage.

FIG. 2 shows a flowchart of a method of optimizing the assignment of data storage resources in the multi-pool data storage arrangement shown in FIG. 1. As discussed above, each pool includes a plurality of data storage resources arranged in tiers. Operation S2.1 includes performing a gap analysis for each tier of each pool. The gap analysis is for determining the extent to which each tier of each pool has excess capacity or excess demand. The gap analysis is essentially an analysis of the balance of capacity versus demand in each tier of each pool. This can be carried out by looking at performance metrics such as latency and response time and so on, for each tier. For example, each data storage resource in a tier can have a specific performance metric measured over a set period of time, compared against a standard value for the metric. The performance metric could be the response time for a specific data size being written to a data storage resource. This response time can then be captured for all data storage resources in a tier and compared to a predetermined standard response time. Those resources that are reacting faster than the predetermined standard response time are said to have excess capacity and those resources reacting slower than the predetermined standard response time are said to have excess demand. The time differences from those measured compared to the standard time provide an objective measure of the gap produced by this gap analysis.

Operation S2.2 includes modeling the effect of switching data storage resources from a tier of a first pool to a tier of a second pool in terms of the effect of the switch on excess capacity and excess demand. Once the gap analysis has been performed then it is desirable to consider how making changes to the data storage arrangement will change the overall capacity and demand. For example, in a simple case, where there is excess capacity in tier 2 of pool 1 and excess demand in tier 2 of pool 2, then the outcome of shifting different resources from tier 2 of pool 1 to tier 2 of pool 2 may need to be considered. The modeling can be considered as a process by which different switching outcomes are considered, in terms of the effect that the switching would have on the overall performance of the data storage arrangement. For example, in a more complex case where three resources have excess capacity and three resources have excess demand, then many different switching possibilities will need to be considered to see what effect different switches will have on the overall performance.

Operation S2.3 includes determining an improved arrangement of data storage resources in the tiers of the pools that reduce excess capacity and excess demand, from the modeling of the effect of switching data storage resources between pools. Operation S2.4 includes switching at least one data storage resource from a tier of a first pool to a tier of a second pool to match the determined improved arrangement of data storage resources. After the modeling has been completed in operation S2.2, then an improved arrangement can be determined from the consideration of the outcome of different switching propositions. If there are several different outcomes that provide improvement to the storage performance, then the best may be selected, which reduces overall excess capacity and excess demand to a minimum in the data storage arrangement. Once the improved arrangement has been determined, then the necessary switches can be made to implement the changes needed to create the chosen improved arrangement of data storage resources. The best arrangement may not necessarily be selected, since secondary factors such as the amount of interruption that changes will make can be considered. A single change of resource from one pool to another may be preferred over a complex switch that involves multiple resources changing pools if the difference in the gain between the two scenarios is small.

Figure 3:
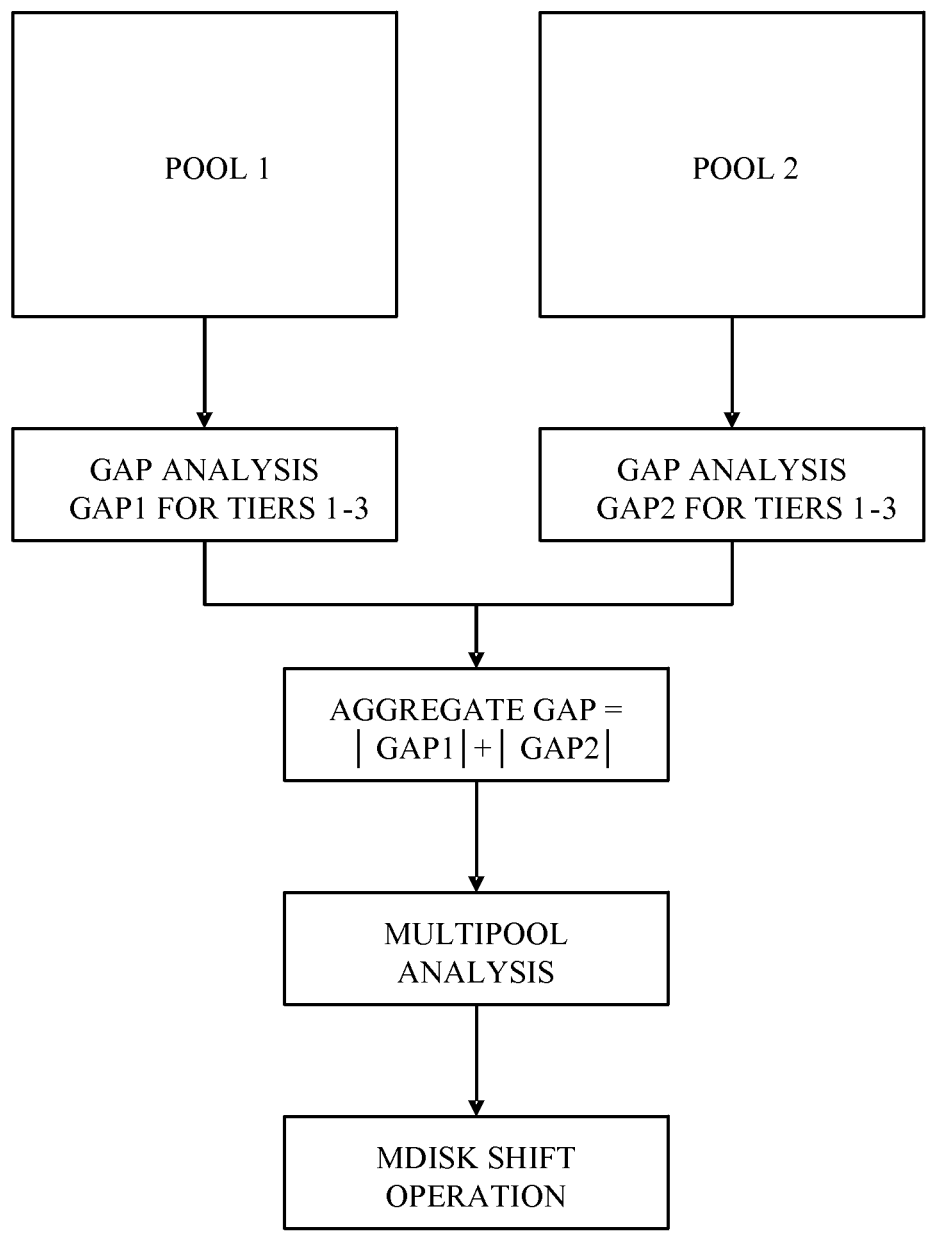
FIG. 3 is a flow diagram of the process of FIG. 2, applied to a two-pool data storage arrangement.

FIG. 3 depicts the process described above in an example using two pools. In respect to each pool, sub-volume workload analysis, sub-volume extent demand and tier extent physical capacity are known. In this context, the word "extent" refers to a specific data chunk or slice within the storage system. Both pools use auto-tiering, which is essentially an automated progression or demotion of data across different tiers of the storage devices. In this example, there are three tiers of data storage within each pool. The auto-tiering optimizes the storing of data within each pool of the data storage arrangement.

Two independent gap analyses are performed on the pools respectively. A gap analysis is performed for each tier of each pool, as described in detail above. This analysis results in a GAP1 total for tiers 1 to 3 of pool 1 and a GAP2 total for tiers 1 to 3 of pool 2. A positive number for the GAP total implies that there is excess capacity in the tiers of the respective pool and a negative number for the gap total implies that there is excess demand in the tiers of the respective pool. An aggregate gap total can be calculated by adding the GAP1 and GAP2 numbers together (ignoring their sign). This total gives an indication of the size of the mismatch in the pools.

Once the gap analyses have been performed, then a multi-pool analysis is performed. If GAP 1×GAP2≥0 (implying that both pools have excess demand or that both pools have excess capacity) then no action is taken. If GAP1>GAP2 then the process will evaluate the effect of shifting $MDisk_j$ (for j=1 to m) from pool 1 to pool 2. If the projected aggregated gap is improved then $MDisk_j$ will be moved and GAP1 and GAP2 are adjusted accordingly and the process repeats the shift evaluation for the next value of j. Once at least one MDisk is designated to be moved and the evaluation is complete, then in a separate operation, the selected MDisks are removed from the source pool and added to the target pool.

Figure 4:
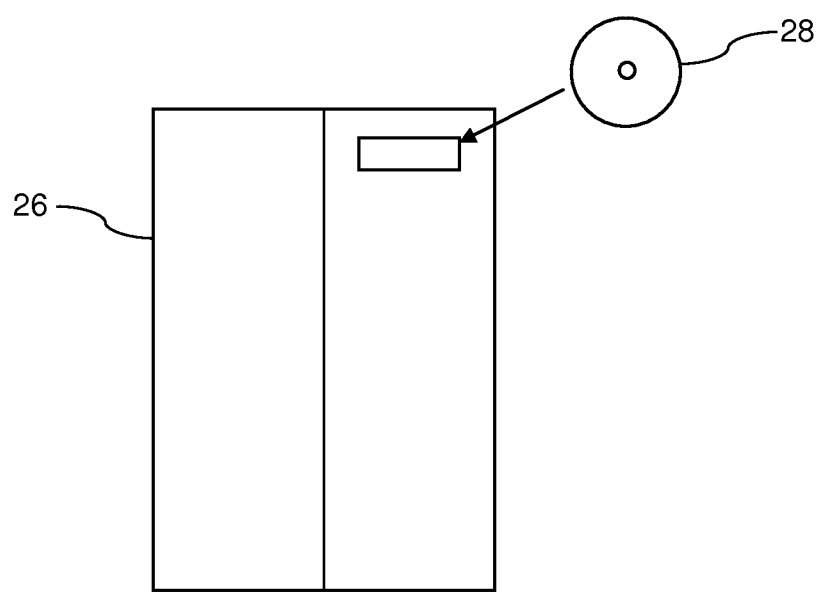
FIG. 4 is a diagram of a processor.

FIG. 4 illustrates a processor 26 that is connected to (or operates) the virtualization engine 16 of FIG. 1. The processor 26 is controlled via a computer program product on a computer readable medium 28, which is a portable compact disc read-only memory (CD-ROM) 28. The computer program product includes instructions for operating the processor 26. The processor 26 controls the operation of the process shown in FIGS. 2 and 3. The operations of performing the gap analyses, modeling the effect of switching resources between tiers in different pools, determining the best arrangement of data storage resources and switching at least one resource between pools is all carried out by the processor 26 under the control of the computer program product on the CD-ROM 28.

Various adaptations of the method of FIG. 2 are possible. For example, the switching of at least one data storage resource from a tier of a first pool to a tier of a second pool can be configured so that this is only performed if the gain for reducing excess capacity and excess demand is above a predetermined threshold. This will prevent very small imbalances from triggering the switching of data storage resources between pools, which will necessarily involve data storage capacity resources being temporarily unavailable to the system during the movement and system resources being used for these movements competing with work supported the system's primary purpose, which is to be avoided if the perceived gain is only very small. The threshold can be set as a multiple of the smallest storage unit available for switching, for example.

Similarly, prior to the switching of at least one data storage resource from a tier of a first pool to a tier of a second pool, it is possible to delay for a predetermined length of time and rerun the gap analyses, modeling and determining actions. This prevents an unusual result from the gap analyses from forcing through a change in the configuration of the data storage resources that would not be ideal. After a predetermined length of time, the process operations can be rerun to see that they confirm the changes recommended from the previous execution of these steps, and only then will the actual data resources be swapped.

It is also possible to enrich the optimization method with a multi-tier gap analysis and matching mechanism which would shift a data storage capacity resource of tier 1 in excess in pool 1, for example, to address a demand of tier 2 in pool 2, provided that tier 1 would have better storage processing capability than tier 2. In this way the switching of data storage resources takes place across different tiers in different pools, not just the switching of data storage resources between the same tier in different pools.

The method can also be used in more elaborate situations where, for instance, the auto-tiering algorithm that is managing each of the pools, supports sophisticated behaviors such as the case combining response time target goals (storage resource partial pining for selected volumes) and storage capacity resource optimization (storage capacity resource allocation in best effort mode). For these cases, the auto-tiering would produce gap analysis for each of the pools and the multi pool optimization method would be applicable.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a CD-ROM, a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of at least one programming language, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes at least one executable instruction for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of optimizing assignment of data storage resources in a data storage arrangement having a plurality of pools, each pool comprising a plurality of data storage resources arranged in tiers, the method comprising:

performing, by a processor, a gap analysis for a plurality of tiers of a plurality of pools, the gap analysis including a comparison of performance capacity versus performance demand for each tier of the plurality of tiers of the plurality of pools, the gap analysis also determining an extent to which tiers of pools have, relative to a standard data storage performance metric, excess performance capacity and excess performance demand;

modeling, by a processor, an effect of switching data storage resources from a first pool tier to a second pool tier in terms of the effect of the switch on excess performance capacity and excess performance demand;

determining, by a processor, an improved arrangement of data storage resources in the first pool tier and the second pool tier that reduces excess performance capacity and excess performance demand, based on the modeling of the effect of switching data storage resources between pools; and switching at least one data storage resource from the first pool tier to the second pool tier based on the modeling.

2. The method of claim 1, wherein the switching of at least one data storage resource from the first pool tier to the second pool tier is performed if a gain for reducing excess performance capacity and excess performance demand is above a predetermined threshold.

3. The method of claim 1, and further comprising, prior to the switching of at least one data storage resource from the first pool tier to the second pool tier, delaying for a predetermined length of time and rerunning the gap analysis, the modeling and the determining.

4. The method of claim 1, wherein the determining of the improved arrangement of data storage resources in the first pool tiers and the second pool tiers for reducing excess performance capacity and excess performance demand comprises matching excess performance capacity to excess performance demand in corresponding tiers in different pools to reduce overall excess performance capacity and excess performance demand.

5. A system for optimizing assignment of data storage resources in a data storage arrangement having a plurality of pools, each pool comprising a plurality of data storage resources arranged in tiers, the system comprising:
  a memory; and
  a processor configured to:
    perform a gap analysis for each pool tier, the gap analysis including a comparison of performance capacity versus performance demand for each tier of the plurality of tiers of the plurality of pools, the gap analysis also determining an extent to which each pool tier has, relative to a standard data storage performance metric, excess performance capacity and excess performance demand;
    model an effect of switching data storage resources from a first pool tier to a second pool tier in terms of the effect of the switch on excess performance capacity and excess performance demand;
    determine an improved arrangement of data storage resources in the first and the second pool tiers that reduces excess performance capacity and excess performance demand, from modeling of the effect of switching data storage resources between pools; and
    switch at least one data storage resource from the first pool tier to the second pool tier to match the improved arrangement of data storage resources.

6. The system of claim 5, wherein the processor is arranged so that the switching of at least one data storage resource from the first pool tier to the second pool tier is performed if a gain for reducing excess performance capacity and excess performance demand is above a predetermined threshold.

7. The system of claim 5, wherein the processor is further arranged, prior to the switching of at least one data storage resource from the first pool tier to the second pool tier, to delay for a predetermined length of time and rerunning the gap analysis, the modeling and the determining.

8. The system of claim 5, and wherein the processor is arranged, when determining the improved arrangement of data storage resources in the first pool tier and the second pool tier for reducing excess performance capacity and excess performance demand, to match excess performance capacity to excess performance demand in corresponding tiers in different pools to reduce overall excess performance capacity and excess performance demand.

9. A computer program product for optimizing assignment of data storage resources in a data storage arrangement of a computer system having a plurality of pools, each pool comprising a plurality of data storage resources arranged in tiers, the computer program product contained on a non-transitory computer readable data storage medium having program instructions embodied therewith, the program instructions executable by a computer to the cause computer to:
  perform a gap analysis for each tier of each pool, the gap analysis including a comparison of performance capacity versus performance demand for each tier of the plurality of tiers of the plurality of pools, the gap analysis also determining an extent to which each tier of each pool has, relative to a standard data storage performance metric, excess performance capacity and excess performance demand;
  model an effect of switching data storage resources from a first pool tier to a second pool tier in terms of the effect of the switch on excess performance capacity and excess performance demand;
  determine an improved arrangement of data storage resources in the first pool tiers and the second pool that reduces excess performance capacity and excess performance demand, from the modeling of the effect of switching data storage resources between pools; and
  switch at least one data storage resource from the first pool tier to the second pool tier to match the improved arrangement of data storage resources.

10. The computer program product of claim 9, wherein the instructions for switching at least one data storage resource from the first pool tier to the second pool tier are performed if a gain for reducing excess performance capacity and excess performance demand is above a predetermined threshold.

11. The computer program product of claim 9, and further comprising, prior to the instructions for switching at least one data storage resource from the first pool tier to the second pool tier, instructions for delaying for a predetermined length of time and rerunning the gap analysis, modeling and determining instructions.

12. The computer program product of claim 9, and wherein the instructions for determining the improved arrangement of data storage resources in the first pool tier and the second pool tier for reducing excess performance capacity and excess performance demand comprise instructions for matching excess performance capacity to excess performance demand in corresponding tiers in different pools to reduce overall excess performance capacity and excess performance demand.

* * * * *